United States Patent
Wang et al.

(10) Patent No.: US 8,737,496 B2
(45) Date of Patent: *May 27, 2014

(54) CHANNEL QUALITY ESTIMATION FOR MLSE RECEIVER

(75) Inventors: Yi-Pin Eric Wang, Fremont, CA (US); Jung-Fu Cheng, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 602 days.

This patent is subject to a terminal disclaimer.

(21) Appl. No.: 12/752,471

(22) Filed: Apr. 1, 2010

(65) Prior Publication Data

US 2011/0243283 A1    Oct. 6, 2011

(51) Int. Cl.
*H04K 1/10*    (2006.01)

(52) U.S. Cl.
USPC ........... 375/260; 375/227; 375/267; 375/347; 370/252

(58) Field of Classification Search
USPC .......................................... 375/346, 260, 227
See application file for complete search history.

(56) References Cited

U.S. PATENT DOCUMENTS

| 2005/0008092 A1* | 1/2005 | Kadous | 375/267 |
| 2010/0091894 A1* | 4/2010 | Maltsev et al. | 375/260 |
| 2011/0211488 A1* | 9/2011 | Kwon et al. | 370/252 |
| 2011/0223961 A1* | 9/2011 | Chen et al. | 455/522 |
| 2011/0261872 A1* | 10/2011 | Wang et al. | 375/227 |

FOREIGN PATENT DOCUMENTS

WO    WO 2006/069397 A2    6/2006

OTHER PUBLICATIONS

Cioffi J. M. et al. "MMSE decision-feedback equalizers and coding—part 1: equalization results," IEEE Trans. Comm., vi. 43, No. 10, pp. 2582-2594, Oct. 1995.
Cioffi J. M. et al. "MMSE decision-feedback equalizers and coding—part II: coding results," IEEE Trans. Comm., vi. 43, no. 10, pp. 2595-2594, Oct. 2604.

* cited by examiner

*Primary Examiner* — Eva Puente

(57) ABSTRACT

A receive signal processor jointly detects a signal-of-interest with one or more other signals. The signal-to-interference-plus-noise ratio for the signal-of-interest is determined by computing per-subcarrier signal-to-interference-plus-noise ratios for a plurality of subcarriers carrying the signal-of-interest, computing per-subcarrier capacities for the subcarriers based on the per subcarrier signal to interference ratios, and computing a total signal-to-interference-plus-noise ratio for the subcarriers based on the per-subcarrier capacities of the subcarriers.

10 Claims, 4 Drawing Sheets

CHANNEL QUALITY ESTIMATION FOR MLSE RECEIVER

BACKGROUND

The present invention relates generally to signal quality estimation in a mobile communication network and, more particularly, to signal quality estimation for the uplink in LTE systems.

Long Term Evolution (LTE) systems use single-carrier frequency-division multiple-access (SC-FDMA) for uplink transmissions. The use of single carrier modulation for the uplink is motivated by the lower peak-to-average ratio of the transmitted signal compared for to conventional OFDM, which results in higher average transmit power and increased power amplifier efficiency. The use of SC-FDMA in the uplink, however, gives rise to an inter-symbol interference (ISI) in dispersive channels. It is important to mitigate the effects of ISI so that SC-FDMA can improve power amplifier efficiency without sacrificing performance.

Linear minimum mean square error (LMMSE) receivers in the base station (also known as an eNodeB) can suppress ISI using linear frequency domain equalization. LMMSE receivers are designed to maximize the signal-to-interference-plus-noise ratio (SINR) for each subcarrier component. Though LMMSE improves performance significantly beyond a simple match filtering receiver, further improvements in performance could be obtained with advanced receivers using techniques such as Turbo Soft Interference Cancellation (TurboSIC), or near maximum-likelihood (ML) detectors, such as Serial Localization with Indecision (SLI) and Assisted Maximum Likelihood Detector (AMLD). These advanced receivers are expected to achieve performance very close to the performance of a maximum-likelihood detector.

One problem encountered with the deployment of advanced receivers is obtaining reliable channel quality indication (CQI) estimates. CQI estimates are used, for example, for link adaptation and scheduling in the uplink of LTE. Currently, there is no solution for CQI estimation for SLI, MLD, ML, or near ML receivers in the uplink in LTE systems.

SUMMARY

The present invention relates to the estimation of signal-to-interference-plus noise ratios (SINRs) in receivers using ML or near ML detectors for the uplink of an LTE system. The embodiments of the present invention enable more accurate CQI estimation for single input, single output (SISO) channels and single input, multiple output (SIMO) channels contaminated by noise and interference that can be spatially correlated and frequency selective. The present invention can be applied to scheduling one or multiple uplink transmissions on the same frequencies (i.e., multi-user MIMO).

One exemplary embodiment of the invention comprises a method for computing SINR of a signal received on an OFDM carrier over communication channel. The method comprises jointly detecting symbols in a signal-of-interest, and computing a signal-to-interference-plus-noise ratio for the signal-of-interest. The SINR is computed by computing per-subcarrier signal-to-interference-plus-noise ratios for a plurality of subcarriers carrying the signal-of-interest, computing per-subcarrier capacities for the subcarriers based on the per subcarrier SINRs, and computing a total SINR for the subcarriers based on the per-subcarrier capacities of the subcarriers.

Another exemplary embodiment of the invention comprises a receive signal processor for a communications device having one or more receive antennas. The receive signal processor comprises a detector to jointly detect symbols in a signal-of-interest received on said one or more receive antennas, and a metric processor to compute a SINR for the signal-of-interest. The metric processor is configured to compute per-subcarrier SINRs for a plurality of subcarriers carrying the signal-of-interest, compute per-subcarrier capacities for the subcarriers based on the per subcarrier SINRs, and compute a total SINR for the subcarriers based on the per-subcarrier capacities of the subcarriers.

DETAILED DESCRIPTION

Figure 1:
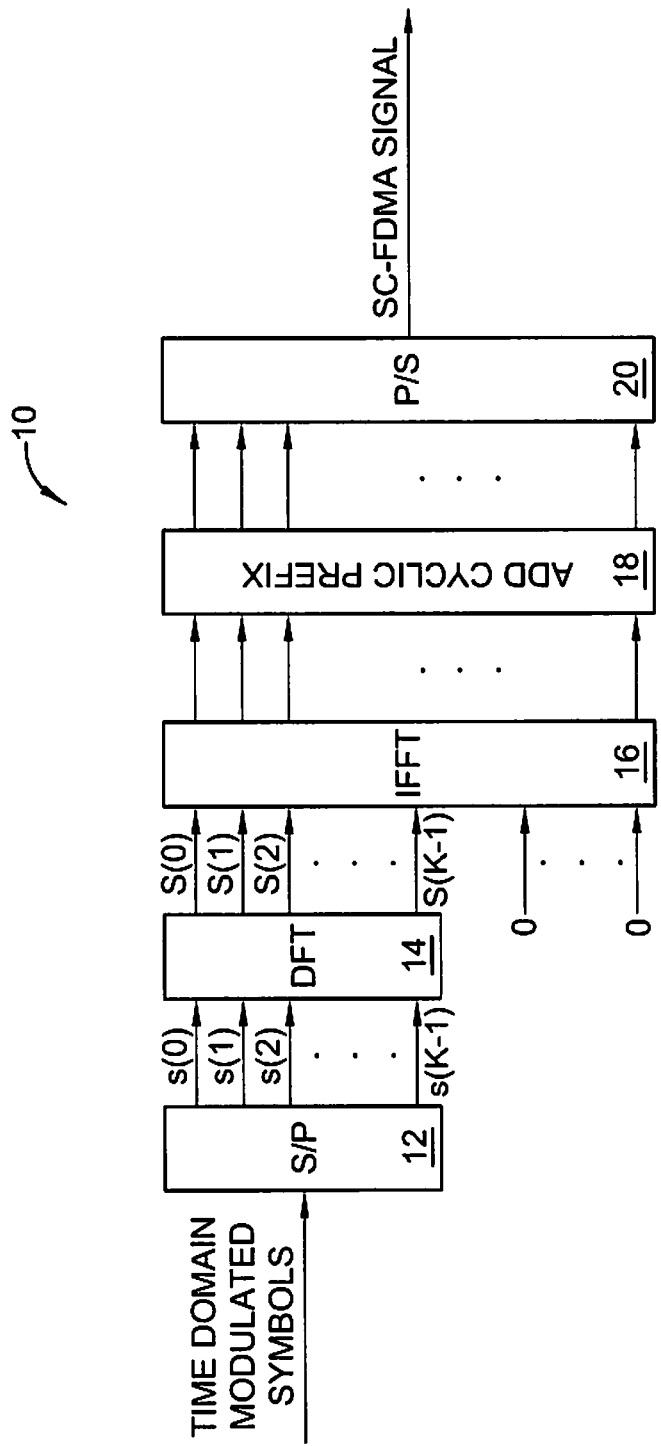
FIG. 1 illustrates an exemplary block diagram of an uplink transmitter.

Referring now to the drawings, FIG. 1 illustrates an exemplary uplink transmitter 10 for generating an SC-FDMA signal. Transmitter 10 comprises a serial-to-parallel (S/P) converter 12, a discrete Fourier transform (DFT) unit 14, an inverse fast Fourier transform (IFFT) unit 16, a cyclic prefix adder 18, and a parallel-to-serial (P/S) converter 20. Serial-to-parallel converter 12 converts a serial stream of time-domain modulated symbols $s(0), s(1), \ldots, s(K-1)$ to a parallel set of symbols. DFT 14 converts the time-domain modulated symbols to frequency-domain symbols $S(0), S(1), \ldots, S(K-1)$. As a result, each frequency-domain symbol is a function of all time-domain symbols. IFFT 16 applies an inverse Fourier transform to the frequency-domain symbols, cyclic prefix adder 18 adds a cyclic prefix to the IFFT output, and parallel-to-serial converter 20 converts the parallel symbols into a serial SC-FDMA signal stream. In frequency-selective channels, the time-domain symbols cannot be separated, interference-free, through linear equalization and IFFT. In this situation, ML or near-ML detectors that jointly detect the time-domain symbols $s(0), s(1), \ldots, s(K-1)$ offer performance improvement.

Figure 2:
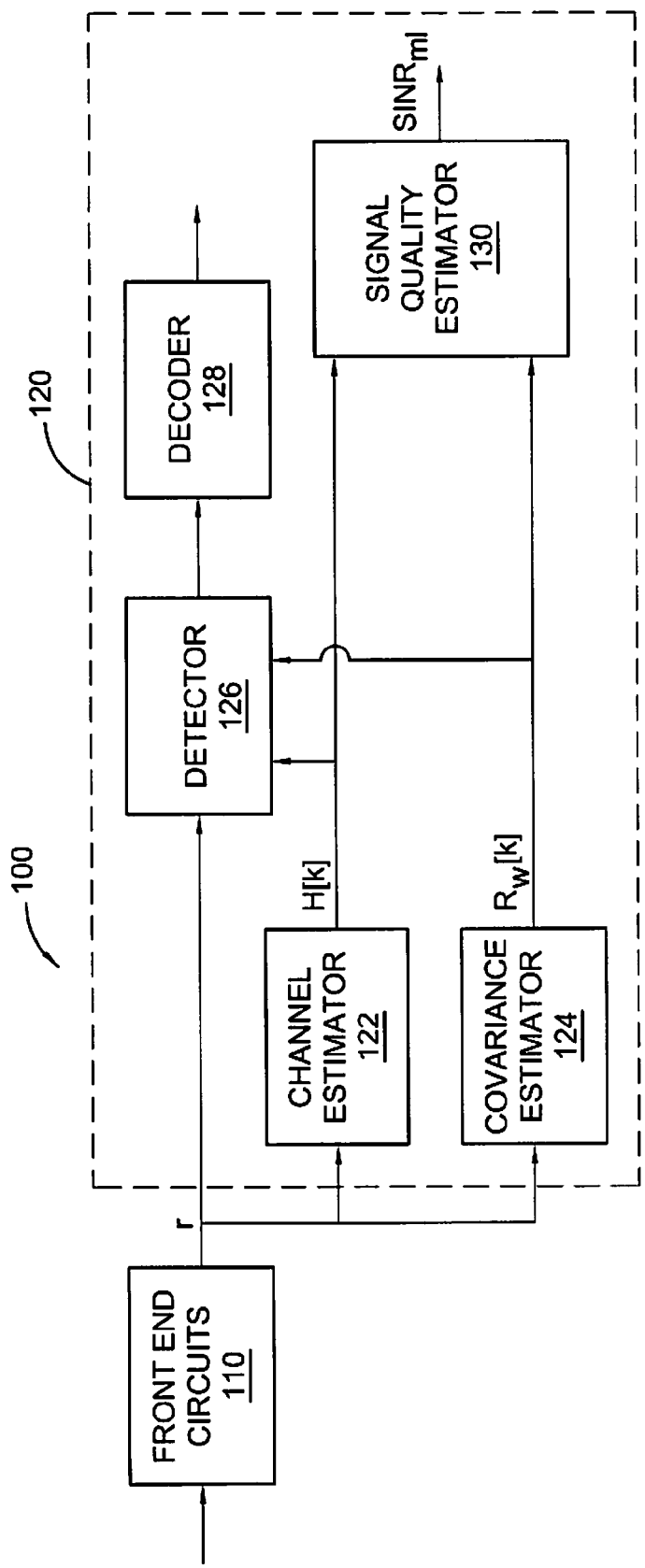
FIG. 2 illustrates an exemplary receiver according to one embodiment of the present invention using a maximum likelihood (ML) or near ML detector to jointly detect a signal-of-interest with one or more other signals.

FIG. 2 illustrates an exemplary receiver 100 according to one embodiment of the present invention. The receiver 100 includes front end circuits 110 and a receive signal processor 120. The front end circuits 110 downconvert the received signal to baseband frequency, amplify and filter the received signal, and convert the received signal to digital form for input to the receive signal processor 120. The main purpose of the receive signal processor 120 is to demodulate and decode a received signal-of-interest. The signal-of-interest may be received on one or more receive antennas. The main functional components of the receive signal processor 120 comprise a channel estimator 122, impairment covariance estimator 124, joint detector 126, decoder 128, and signal quality estimator 130. The functional components of the receive signal processor 120 may be implemented by one or more microprocessors, hardware, firmware, or a combination thereof.

The channel estimator 122 generates an estimate of the communication channel from a transmit antenna at a transmitting station (not shown) to one or more receive antennas (not shown) using any known channel estimation techniques. The impairment covariance estimator 124 uses the channel estimates from the channel estimator 122 to estimate the covariance of the signal impairments in the signal-of interest. The impairments may include, for example, multi-user interference, self interference, other-cell interference, and noise. The channel estimates and impairment covariance estimates are input to the detector 126, which uses the impairment covariance estimates along with the channel estimates to demodulate the received signal.

The detector 126 preferably comprises an ML detector or near ML detector, such as a reduced state sequence estimator, Serial Localization with Indecision Detector (SLID) and Assisted Maximum Likelihood Detector (AMLD). The detector 126 jointly processes two or more symbols in the signal-of-interest and generates received symbol estimates for the signal-of-interest. The received symbol estimates are demodulated to form received bit soft values that are fed to a decoder 128. The decoder 128 detects errors that may have occurred during transmission and outputs an estimate of a transmitted information sequence.

The signal quality estimator 130 estimates a signal-to-interference-plus-noise ratio (SINR) for the signal-of-interest. The SINR may then be used to generate a channel quality indication (CQI) value, or modulation and coding scheme (MCS) value. The CQI and/or MCS values are reported to the transmitting station for link adaptation and/or scheduling. Therefore, reliable estimates of the SINR are needed. Techniques are known for computing reliable SINR estimates for linear minimum means squared error (LMMSE) receivers for uplink in LTE systems. However, there are currently no known techniques for producing reliable SINR estimates for ML or near ML receivers for the uplink in LTE.

Figure 3:
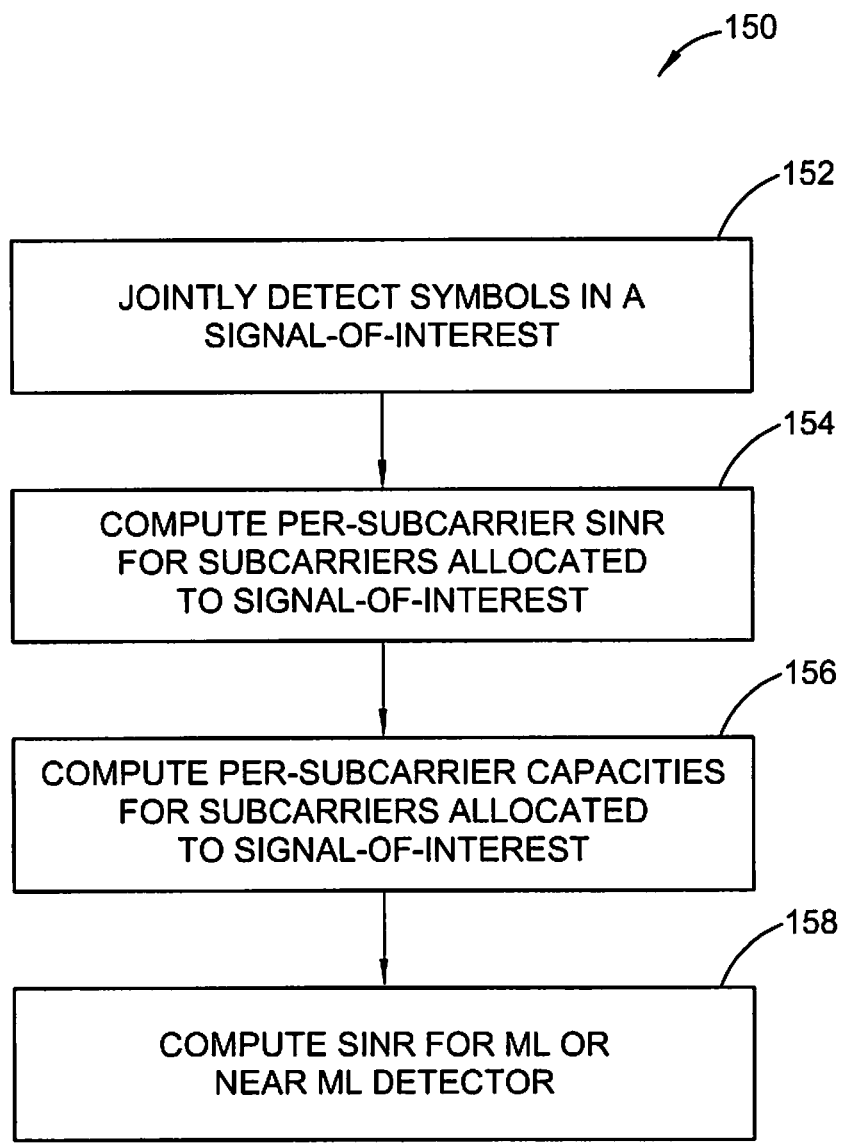
FIG. 3 illustrates an exemplary method implemented by the receiver for computing a signal-to-interference-plus-noise ratio of the signal-of-interest detected using an ML or near-ML detector.

The signal quality estimator 130 according to embodiments of the present invention is able to produce reliable estimates of SINR for single input/single output (SISO) and single input/multiple output (SIMO) systems. FIG. 3 illustrates a method 150 according to one exemplary embodiment of the invention for generating SINR estimates for a signal-of-interest transmitted over a SC-FDMA channel. A detector 126 jointly detects symbols in a signal-of interest (block 152). To compute the SINR of the signal-of-interest, the signal quality estimator 130 first computes a per-subcarrier SINR estimate for each subcarrier allocated to the signal-of-interest (block 154). The per-subcarrier SINR estimate, denoted SINR$_k$, is computed based on the ratio of the symbol energy E$_s$, the one-sided white noise power spectral density N$_o$, and the channel response H[k] for the subcarrier. In the case of a single transmit and receive antenna, the per-subcarrier SINR, SINR$_k$, is given by:

$$SINR_k = \frac{E_s}{N_0}|H[k]|^2, \quad \text{Eq. (1)}$$

where k is an index indicating the subcarrier. The dispersive channel response H[k] is obtained from channel estimator 122. Typically, pilot symbols are used in the channel estimation process; however, data symbols could also be used as effective pilot symbols to improve channel estimation. The channel estimate produced from the pilot signal should be scaled appropriately to account for the power difference between pilot symbols and data symbols.

After the per-subcarrier SINR is obtained, the signal quality estimator 130 computes a per subcarrier capacity C$_k$ for the subcarriers allocated to the signal-of-interest (block 156) The per-subcarrier capacity C$_k$ for a given subcarrier k is computed according to:

$$C_k = \log(1+SINR_k). \quad \text{Eq. (2)}$$

The logarithmic calculations of Equation (2) typically comprise base 2 logarithmic calculations, but may comprise other base logarithmic calculations. Finally, the signal quality estimator 130 combines the per-subcarrier capacities C$_k$ and computes the SINR of the signal-of-interest (block 158).

In one exemplary embodiment, the per-subcarrier capacities C$_k$ for the subcarriers allocated to the signal-of-interest are summed and averaged to compute an average SINR given by:

$$C_{AVG} = \frac{1}{K}\sum_{k=0}^{K-1} C_k. \quad \text{Eq. (3)}$$

The average capacity C$_{AVG}$ is then used to compute SINR$_{MLD}$ of the signal-of-interest for a ML detector or near ML detector according to:

$$SINR_{MLD} = \exp(C_{AVG})-1. \quad \text{Eq. (4)}$$

Combining Eqs. 1-4, the SINR$_{MLD}$ for the signal-of-interest is given by:

$$SINR_{MLD} = \exp\left(\frac{1}{K}\sum_{k=0}^{K-1} \log\left(1 + \frac{E_s}{N_0}\sum_{m=0}^{M-1}|H_m[k]|^2\right)\right) - 1. \quad \text{Eq. (5)}$$

The exp(x) and log(x) functions in Eq. (5) may, in some embodiments, be replaced by linear approximations or look-up tables.

To improve uplink communication reliability and system throughput, one embodiment of the receiver uses multiple receive antennas to receive a signal-of-interest transmitted from a single transmit antenna. In cases where the noise and interference exhibit no correlation, a spatial maximal ratio combining (MRC) of the multiple received signals is optimal. With an MRC front-end, the SINR$_{MLD}$ for a ML receiver can be calculated as:

$$SINR_{MLD} = \exp\left(\frac{1}{K}\sum_{k=0}^{K-1} \log\left(1 + \frac{E_s}{N_0}\sum_{m=0}^{M-1}|H_m[k]|^2\right)\right) - 1, \quad \text{Eq. (6)}$$

where H$_m$[k] is the frequency response of the channel corresponding to the k$^{th}$ subcarrier from the transmit antenna to the m$^{th}$ receive antenna and M is the total number of receive antennas.

In more general cases, the noise and interference can exhibit correlation across frequencies and receive antennas. If R$_w$[k] is the M×M correlation matrix corresponding to the k$^{th}$ subcarrier and H[k] is the vector collecting the frequency responses of the k$^{th}$ subcarrier from the transmit antenna to all M receive antennas, then the channel response is given by:

$$H[k] = \begin{bmatrix} H_0[k] \\ H_1[k] \\ \vdots \\ H_{M-1}[k] \end{bmatrix}.$$  Eq. (7)

The $SIR_{MLD}$ of an ML receiver can be calculated as:

$$SINR_{MLD} = \exp\left(\frac{1}{K}\sum_{k=0}^{K-1} \log(1 + E_s H_0^H[k] R_w^{-1}[k] H_0[k])\right) - 1,$$  Eq. (8)

where $H_0^H[k]$ is the Hermitian transpose of $H_0[k]$ and $R_w^{-1}[k]$ is the inverse of $R_w[k]$. It can be verified that, when $R_w[k]N_0I$ is diagonal for all k, Eq. (8) reduces to Eq. (6).

As previously described, the $SINR_{MLD}$ may be used to generate a channel quality indication (CQI) or MCS (modulation and coding scheme) value to be reported to the transmitting station for link adaptation and/or scheduling. For example, the MCS/CQI to be reported can be obtained from a mapping function given by:

$$MCS = MCSFormat(SINR_{MLD}).$$  Eq. (9)

Figure 4:
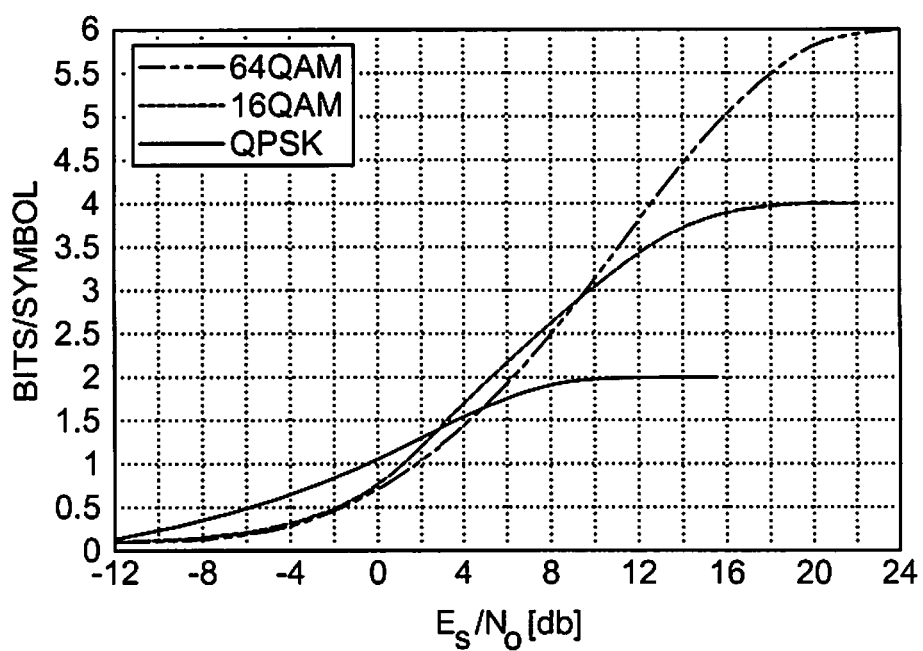
FIG. 4 illustrates a mapping function for translating a computed signal-to-interference-plus-noise ratio into a desired information rate and modulation scheme.

FIG. 4 illustrates one exemplary mapping function for translating $SIR_{MLD}$ to a target information rate and modulation scheme.

Further adjustments can be applied to $SINR_{MLD}$ for link adaptation purposes. As non-limiting examples, such adjustments are typically applied to account for different quality of service requirements, losses induced by implementation imperfection, and channel quality variations within scheduling latency. To account for such variations, the mapping function for translating the $SINR_{MLD}$ to MCS/CQI becomes:

$$MCS_n = MCSFormat(SINR_{MLD} - \delta_n),$$  Eq. (10)

where $\delta_n$ is the said SINR adjustment.

The present invention provides a method and apparatus for easily computing the CQI for SLI, AMLD, or other ML, or near ML, receivers in the uplink of LTE. Thus, the present invention allows the base station to schedule a user to use a transmission rate that is more accurately reflecting the receiver capability, taking full advantage of advanced receiver performance.

What is claimed is:

1. A method of computing a signal-to-interference-plus-noise ratio of a signal received on an OFDM carrier over communication channel, said method comprising:
   jointly detecting symbols in a signal-of-interest received on two or more receive antennas; and
   computing a signal-to-interference-plus-noise ratio for the signal-of-interest by:
      computing per-subcarrier signal-to-interference-plus-noise ratios for a plurality of subcarriers allocated to the signal-of-interest by computing interference correlations across said antennas and combining the contributions of each antenna based on the interference correlations to obtain the per-subcarrier signal-to-interference-plus-noise ratios;
      computing per-subcarrier capacities for the subcarriers allocated to the signal-of-interest based on the per subcarrier signal-to-interference-plus-noise ratios; and
      computing a total signal-to-interference-plus-noise ratio for the subcarriers based on the per-subcarrier capacities of the subcarriers.

2. The method of claim 1 wherein computing a total signal-to-interference-plus-noise ratio for the subcarriers based on the per-subcarrier capacities of the subcarriers comprises:
   computing an average capacity of the subcarriers based on the per-subcarrier capacities for the subcarriers; and
   computing the total signal-to-interference-plus-noise ratio for the subcarriers based on the average capacity of the subcarriers.

3. The method of claim 1 wherein combining the contributions of each antenna to obtain the per-subcarrier signal-to-interference-plus-noise ratios comprises summing the contributions of said antennas to obtain the per-subcarrier signal-to-interference-plus-noise ratios.

4. The method of claim 3 further comprising providing the signal-to-interference-plus-noise ratio to a channel quality indication (CQI) for modulation and coding scheme selection.

5. The method of claim 1 wherein the symbols in the signal of interest comprise time-domain symbols processed by a discrete Fourier transform.

6. A receive signal processor for a communications device having two or more receive antennas, said receive signal processor comprising:
   a detector to jointly detect symbols in a signal-of-interest received on said two or more receive antennas; and
   a metric processor to compute a signal-to-interference-plus-noise ratio for the signal-of-interest and configured to:
      compute per-subcarrier signal-to-interference-plus-noise ratios for a plurality of subcarriers allocated to the signal-of-interest interest by computing interference correlations across said antennas and combining the contributions of each antenna based on the interference correlations to obtain the per-subcarrier signal-to-interference-plus-noise ratios;
      compute per-subcarrier capacities for the subcarriers allocated to the signal-of-interest based on the per subcarrier signal-to-interference-plus-noise ratios; and
      compute a total signal-to-interference-plus-noise ratio for the subcarriers based on the per-subcarrier capacities of the subcarriers.

7. The receive signal processor of claim 6 wherein the metric processor is configured to compute a total signal-to-interference-plus-noise ratio for the subcarriers by:
   computing an average capacity of the subcarriers based on the per-subcarrier capacities for the subcarriers; and
   computing the total signal-to-interference-plus-noise ratio for the subcarriers based on the average capacity of the subcarriers.

8. The receive signal processor of claim 6 wherein the metric processor is configured to combine the contributions of each antenna to obtain the per-subcarrier signal-to-interference-plus-noise ratios by summing the contributions of said antennas to obtain the per-subcarrier signal-to-interference-plus-noise ratios.

9. The receive signal processor of claim 6 wherein the metric processor is further configured to provide the computed signal-to-interference-plus-noise ratio to a channel quality indication (CQI) for modulation and coding scheme selection.

10. The receive signal processor of claim 6 wherein the symbols in the signal of interest comprise time-domain symbols processed by a discrete Fourier transform.

* * * * *